(12) United States Patent  
Matsuda et al.

(10) Patent No.: US 8,725,414 B2  
(45) Date of Patent: May 13, 2014

(54) INFORMATION PROCESSING DEVICE DISPLAYING CURRENT LOCATION AND STORAGE MEDIUM

(71) Applicant: Casio Computer Co., Ltd., Tokyo (JP)

(72) Inventors: Shimpei Matsuda, Tokyo (JP); Takeahi Matsue, Tokyo (JP); Munetaka Seo, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 0 days.

(21) Appl. No.: 13/845,046

(22) Filed: Mar. 17, 2013

(65) Prior Publication Data

US 2013/0245935 A1   Sep. 19, 2013

(30) Foreign Application Priority Data

Mar. 19, 2012   (JP) ................................. 2012-061879

(51) Int. Cl.
  *G01C 21/26*   (2006.01)
  *G01C 21/36*   (2006.01)

(52) U.S. Cl.
  CPC ............ *G01C 21/3614* (2013.01); *G01C 21/26* (2013.01); *G01C 21/3605* (2013.01)
  USPC .......................................... 701/487; 701/469

(58) Field of Classification Search
  CPC ........... G01S 1/02; G01S 1/08; G01S 5/0009; G01S 5/0027; G01S 5/02; G01S 5/0215; G01S 5/0252
  USPC ......... 701/300, 487, 408–412, 468–469, 534; 342/357.2–357.23, 357.35, 357.39, 342/357.43, 357.44, 357.61, 357.62, 342/357.66, 420, 450, 47, 461; 455/569.2, 455/345
  See application file for complete search history.

(56) References Cited

U.S. PATENT DOCUMENTS

| | | | | |
|---|---|---|---|---|
| 5,483,456 A | * | 1/1996 | Kuwahara et al. | 701/446 |
| 5,908,464 A | * | 6/1999 | Kishigami et al. | 701/454 |
| 5,941,930 A | * | 8/1999 | Morimoto et al. | 701/532 |
| 6,721,656 B2 | | 4/2004 | Morita | |
| 7,366,611 B2 | * | 4/2008 | Sweetapple | 701/469 |
| 7,400,969 B2 | * | 7/2008 | Watanabe et al. | 701/469 |
| 8,170,796 B2 | * | 5/2012 | Liu et al. | 701/468 |
| 8,332,149 B2 | * | 12/2012 | Oohashi et al. | 701/533 |
| 8,498,813 B2 | * | 7/2013 | Oohashi et al. | 701/447 |

FOREIGN PATENT DOCUMENTS

| | | | | |
|---|---|---|---|---|
| JP | 09042986 A | * | 2/1997 | G01C 21/00 |
| JP | 2002-277527 A | | 9/2002 | |

* cited by examiner

*Primary Examiner* — John R Olszewski  
*Assistant Examiner* — David Merlino  
(74) *Attorney, Agent, or Firm* — Holtz, Holtz, Goodman & Chick, PC

(57) ABSTRACT

In an information processing device, when a positional information acquiring unit acquires positional information calculated from GPS signals and the like, a movement area setting unit sets a movement area with a size corresponding to a distance between a current location and a destination. When the positional information acquiring unit acquires positional information indicating a current location after setting this movement area, a judgment unit judges whether the positional information is within the movement area. Then, as a result of this judgment, in a case of being within the movement area, a display control unit executes display control of a display unit so as to display on a map the positional information, and in a case of being outside of the movement area, so as not to display on the map the positional information.

10 Claims, 7 Drawing Sheets

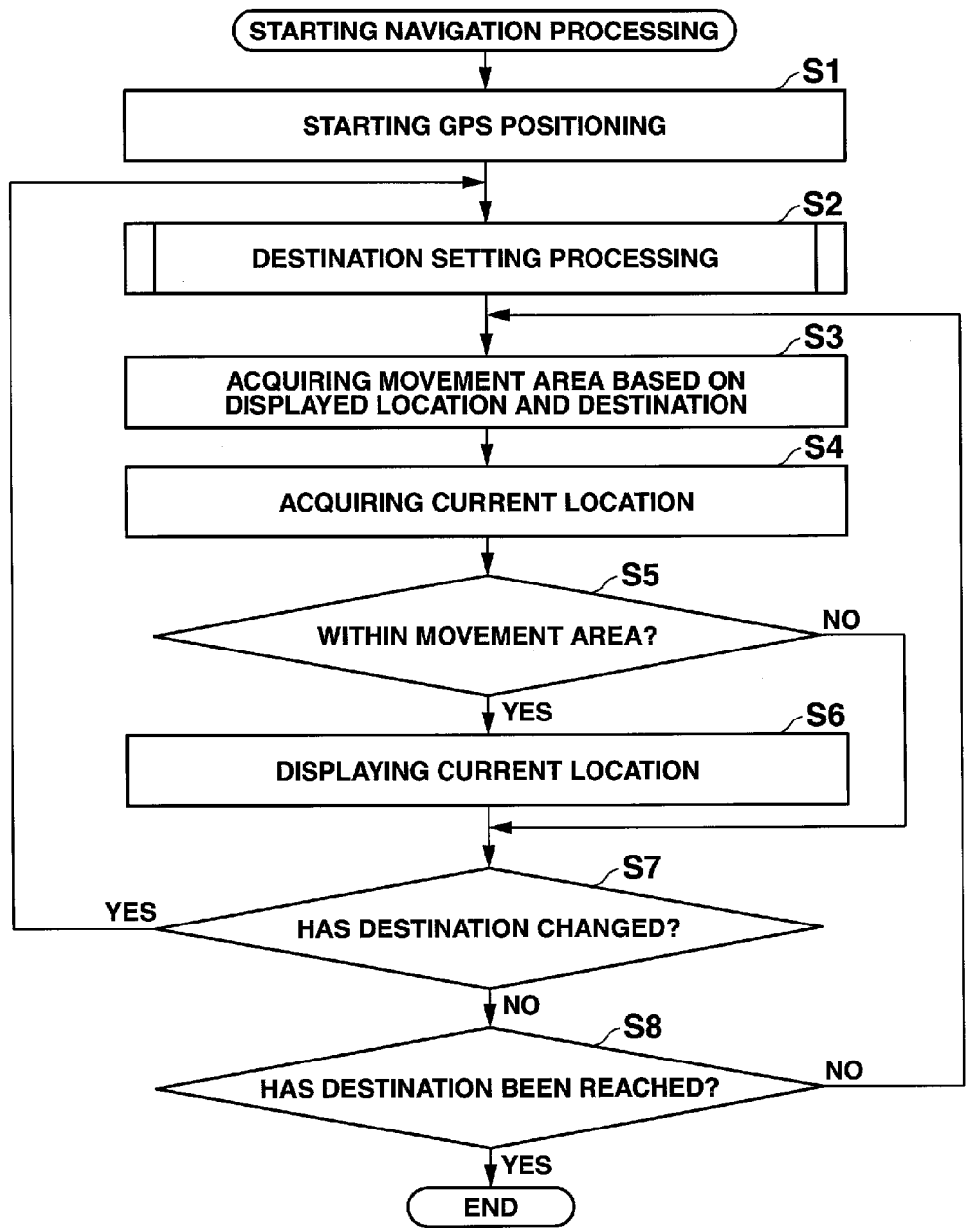

INFORMATION PROCESSING DEVICE DISPLAYING CURRENT LOCATION AND STORAGE MEDIUM

This application is based on and claims the benefit of priority from Japanese Patent Application No. 2012-061879, filed on 19 Mar. 2012, the content of which is incorporated herein by reference.

BACKGROUND OF THE INVENTION

1. Field of the Invention

The present invention relates to an information processing device that displays a user's current location and a storage medium.

2. Related Art

With the development of information and communication technology, a variety of services has been recently provided to users that carry an information processing terminal with them.

As such services, for example, a service that specifies a user's current location by specifying a location of an information processing terminal (hereinafter, referred to as "a current location specifying service") has been known.

The current location specifying service specifies a user's current location by way of triangulation using a radio signal such as a GPS (Global Positioning System) signal.

Here, tracking a current location by way of a radio signal such as a GPS signal may cause an error between an actual location and a location measured.

Therefore, a variety of attempts for improving positioning accuracy has been made, and a GPS receiving device that specifies a user's current location using only GPS signals from GPS satellites with at least a referential ascending vertical angle has been disclosed in Japanese Unexamined Patent Application, Publication No. 2002-277527.

Incidentally, since a radio signal such as GPS signals is influenced by geographical features, buildings, etc. and reflected and/or diffracted, which then may possibly cause multipath propagation.

Therefore, positioning accuracy may not be ensured sufficiently even by the GPS receiving device of Japanese Unexamined Patent Application, Publication No. 2002-277527.

Current location specifying services have been employed in a variety of modes. For example, it can be employed as a navigation system that guides a user to a destination by displaying a destination set by the user and the user's current location together.

If an error occurs between the current location and a location measured upon performing such navigation, problems arise in that its convenience is lost, which leads to the user feeling stress.

SUMMARY OF THE INVENTION

The present invention has been made to address such situations, and has an object of providing an information processing device that does not provide a user with an erroneous positioning result, and a storage medium.

In order to achieve the abovementioned object, an aspect of the present invention is an information processing device, comprising:

a destination setting unit that sets a destination;

a positional information acquiring unit that acquires positional information indicating a current location of the information processing device measured based on a plurality of signals received at a predetermined time interval;

a movement area setting unit that acquires a movement area that is set based on the positional information acquired by the positional information acquiring unit and positional information of the destination;

a judgment unit that judges whether positional information of a current location acquired by the positional information acquiring unit after setting of the movement area acquired by the movement area setting unit is within a movement area acquired by the movement area setting unit; and a display control unit that displays the current location on a predetermined display unit when the judgment unit judges that the positional information of the current location is within the movement area, and does not display the current location on the display unit when the judgment unit judges that the positional information of the current location is outside the movement area.

In order to achieve the abovementioned object, an aspect of the present invention is a storage medium encoded with a computer-readable program that enables a computer to execute functions as: a destination setting unit that sets a destination;

a positional information acquiring unit that acquires positional information indicating a current location of the computer measured based on a plurality of signals received at a predetermined time interval;

a movement area setting unit that acquires a movement area that is set based on the positional information acquired by the positional information acquiring unit and positional information of the destination;

a judgment unit that judges whether positional information of a current location acquired by the positional information acquiring unit after setting of the movement area acquired by the movement area setting unit is within a movement area acquired by the movement area setting unit; and a display control unit that displays the current location on a predetermined display unit when the judgment unit judges that the positional information of the current location is within the movement area, and does not display the current location on the display unit when the judgment unit judges that the positional information of the current location is outside the movement area.

BRIEF DESCRIPTION OF THE DRAWINGS

FIG. 6 is a flowchart illustrating a flow of navigation processing of the information processing device of FIG. 1 having the functional configuration of FIG. 2.

DETAILED DESCRIPTION OF THE INVENTION

In the following, embodiments of the present invention are explained with reference to the drawings.

Figure 1:
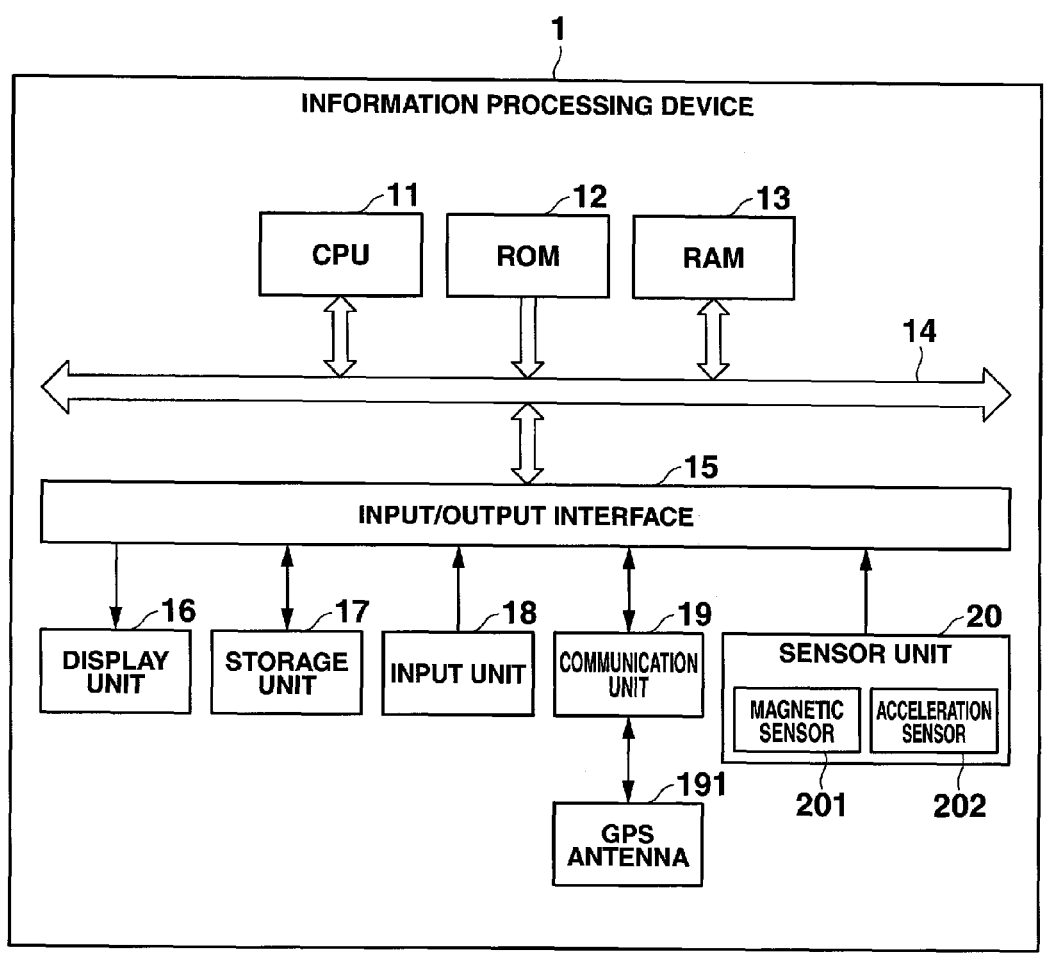
FIG. 1 is a block diagram showing a hardware configuration of an information processing device according to an embodiment of the present invention.

FIG. 1 is a block diagram showing a hardware configuration of an information processing device 1 according to an embodiment of the present invention.

The information processing device 1 is a terminal device that travels along with a user's travel and, for example, any terminal device such as a digital camera, a car navigation system, a cell phone, a smart phone and a tablet terminal can be employed.

The information processing device 1 includes a CPU (Central Processing Unit) 11, ROM (Read Only Memory) 12, RAM (Random Access Memory) 13, a bus 14, an input/output interface 15, a display unit 16, a storage unit 17, an input unit 18, a communication unit 19, and a sensor unit 20.

The CPU 11 executes various processing according to programs that are recorded in the ROM 12, or programs that are loaded from the storage unit 17 to the RAM 13.

The processing executed by the CPU 11 includes the navigation processing of FIG. 6 as described later.

Although the navigation processing is described later, in this processing, the CPU 11 guides the user to a destination by displaying the destination set by the user and a current location of the user together.

The RAM 13 also stores data and the like necessary for the CPU 11 to execute the various processing, as appropriate.

The CPU 11, the ROM 12 and the RAM 13 are connected to one another via the bus 14.

The input/output interface 15 is also connected to the bus 14.

The display unit 16, the storage unit 17, the input unit 18, the communication unit 19, and the sensor unit 20 are connected to the input/output interface 15.

The display unit 16 is composed of a display and displays predetermined information. Examples of the predetermined information displayed on the display unit 16 include a map that shows a current location of the user specified by the CPU 11, a destination set by the user, and the like.

The storage unit 17 is configured by a hard disk, DRAM (Dynamic Random Access Memory), or the like, and stores a variety of programs such as a program defining the processing executed by the CPU 11.

The storage unit 17 stores as appropriate the required data upon the CPU 11 executing a variety of processing.

The input unit 18 is configured by a touch panel, etc., provided with various buttons and the display unit 16 and receives input operations from the user.

The input operations that the input unit 18 receives are supplied to the CPU 11 and then corresponding processing is executed in the CPU 11.

As an example, when the input unit 18 receives a scrolling operation on a map displayed on the display unit 16, the CPU 11 controls the display unit 16 to scroll the map.

Furthermore, when the input unit 18 receives an enlarging operation on the map displayed on the display unit 16, the CPU 11 controls the display unit 16 to display an enlarged map.

The communication unit 19 includes, for example, a GPS antenna 191 that handles GPS signals, and receives GPS signals from a plurality of GPS satellites through the GPS antenna.

The GPS signals received by the communication unit 19 are supplied to the CPU 11 (positional information acquiring unit 111), and are used for calculation of positional information (for example, coordinates on a map) indicating a current location of the information processing device 1.

It should be noted that the communication unit 19 may be adapted to receive not only GPS signals, but also another radio signal.

In other words, it is sufficient so long as the communication unit 19 receives a radio signal that can be used for calculating a current location and may be adapted to receive radio signals sent from access points installed on streets, for example, GPS signals merely being one example thereof.

The sensor unit 20 is a sensor device that detects various conditions such as the tilt and acceleration of the information processing device 1, and is configured to include a magnetic sensor 201 and an acceleration sensor 202.

The magnetic sensor 201 includes a magneto-impedance element for which the impedance changes according to fluctuations in the external magnetic field, and using this magneto-impedance element, detects the three axes (X, Y, Z) of the earth magnetism and outputs data showing the detected result.

Here, a current direction of the information processing device 1 can be specified by using the components of the three axes of the earth magnetism detected by the magnetic sensor 201.

The acceleration sensor 202 includes a piezoresistance-type or capacitance-type detection mechanism and detects the components of the three axes (X, Y, Z) of acceleration using the detection mechanism and outputs data showing the detected result.

Here, the acceleration of the X component detected by the acceleration sensor 202 is associated with an oscillation cycle in a vertical direction of the information processing device 1, the Y component is associated with an oscillation cycle in a horizontal direction of the information processing device 1, and the Z component is associated with an oscillation cycle in a travel direction of the information processing device 1.

Therefore, it is possible to generally specify a travel distance of the information processing device 1 by integrating and using the components of the three axes of acceleration detected by the acceleration sensor 202.

Data outputted from the sensor unit 20 (hereinafter, referred to as "sensor value") is supplied to the CPU 11 and used as auxiliary information for calculating positional information in place of the GPS signals.

For example, the CPU 11 calculates a travel direction of the information processing device 1 based on a sensor value of the magnetic sensor 201 and calculates a travel distance of the information processing device 1 based on the sensor value of the acceleration sensor 202, whereby it is possible to calculate positional information in place of a positioning calculation based on the GPS signals.

Figure 2:
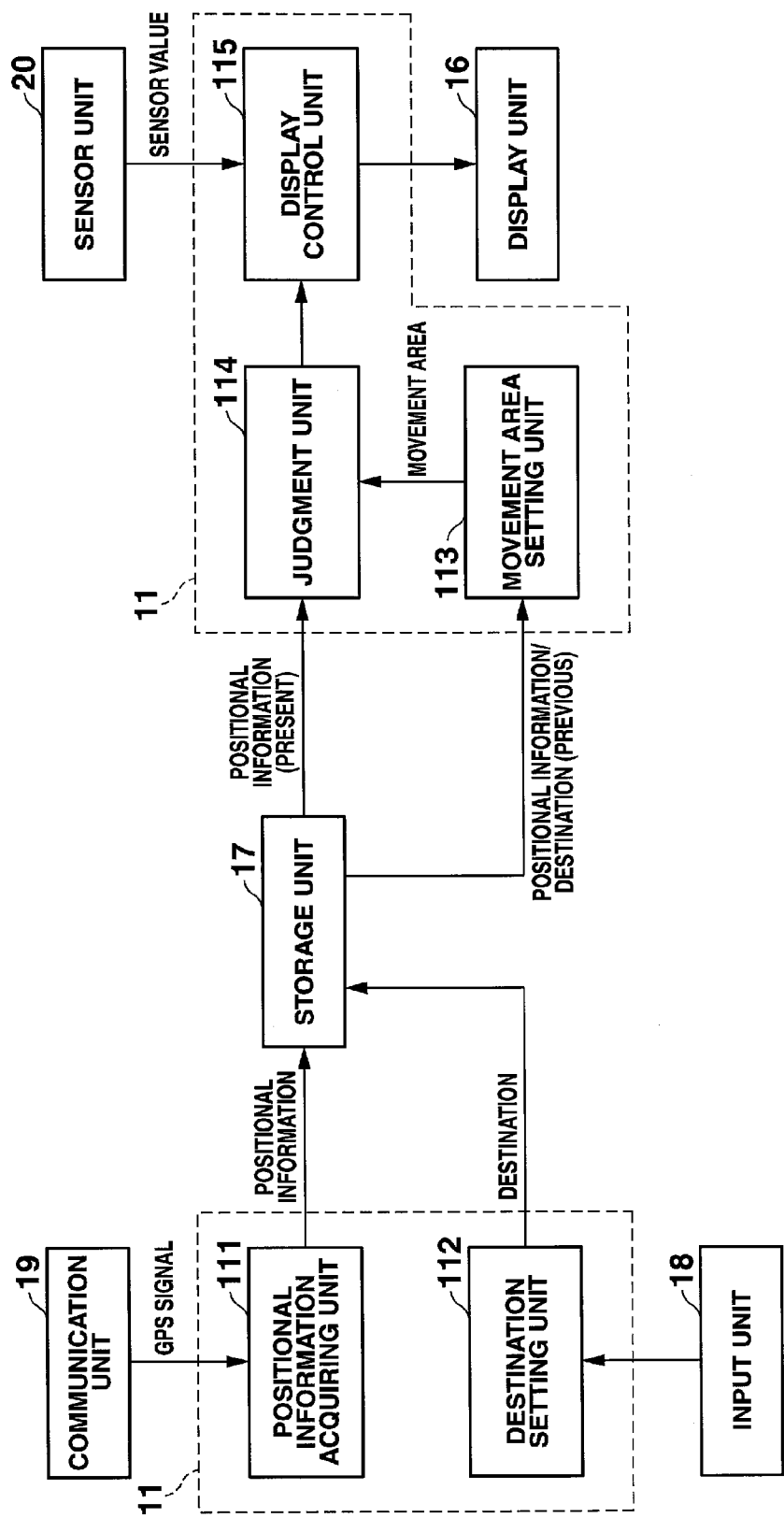
FIG. 2 is a functional block diagram showing a functional configuration for executing navigation processing, among the functional configurations of the information processing device of FIG. 1.

FIG. 2 is a functional block diagram showing a functional configuration for executing navigation processing for guiding a user from a current location to a destination, among the functional configurations of the information processing device of FIG. 1.

When the information processing device 1 executes the navigation processing, the CPU 11 functions as the positional information acquiring unit 111, a destination setting unit 112, a movement area setting unit 113, a judgment unit 114, and a display control unit 115.

Here, as a service providing map information to the user, for example, there is a service in which processing is completed by the information processing device 1 communicating predetermined information with another device (for example, a server), in addition to the service in which processing is completed by the information processing device 1 solely.

For example, in the information processing device 1 such as a car navigation system, it is possible to provide map information to the user by the information processing device 1 solely by way of using map information stored in its hard disk.

On the other hand, in the information processing device 1 such as a cell phone, map information is generally stored on the server. Therefore, the map information is provided to the user by the server sending corresponding map information to the information processing device 1 in response to a request received from the user.

In this regard, in the present embodiment, the navigation processing may be executed by the information processing device 1 solely or the navigation processing may be executed by a server (not illustrated) communicating with the information processing device 1.

It should be noted that, in a case of executing the navigation processing by the information processing device 1 communicating with a server, a predetermined calculation may be executed by the server.

As an example, the processing for performing positioning calculation and the like based on the GPS signals may be executed not by the information processing device 1, but rather by the server.

Processing executed by the server can be set appropriately according to the processing capacity of the information processing device 1, the network capacity between the information processing device 1 and the server, and the like.

Therefore, the term "acquire" hereinafter includes the meaning of acquiring a result calculated by the information processing device 1 itself as well as acquiring, by the information processing device 1, a result calculated by the server having received a calculation request.

The positional information acquiring unit 111 acquires positional information (for example, coordinates) on a map showing a position at the current time (current location) of the information processing device 1 based on the GPS signals supplied from the communication unit 19. Here, the current location can be acquired by a predetermined positioning calculation using at least three GPS signals in a previously known manner.

In addition, the positional information can be acquired at an arbitrary timing by the positional information acquiring unit 111. For example, it is possible to acquire positional information at the time when a request via the input unit 18 from the user is received or in a predetermined interval of time.

In addition, the positional information acquiring unit 111 is adapted to acquire positional information of a current location as well as a positioning accuracy showing the accuracy of positioning calculation.

As the positioning accuracy, Dop value (Dilution of Precision) calculated from an arrangement of the GPS satellites can be employed.

The positional information and the positioning accuracy acquired by the positional information acquiring unit 111 are temporarily stored in the storage unit 17.

The destination setting unit 112 sets as a destination a desired location of a user in response to an input operation received from the user via the input unit 18.

The positional information (for example, coordinates) on a map showing the destination set by the destination setting unit 112 is temporarily stored in the storage unit 17.

Here, setting of a destination can be performed by an arbitrary method. For example, the name of a place or the like on a map inputted by the user may be set as the destination.

Furthermore, the name of a place or the like received from the user through a menu screen showing, for example, a list of names of places may be set as the destination.

In this regard, in addition to these arbitrary methods, the destination setting unit 112 of the present embodiment can set a destination in accordance with a scrolling operation or an enlarging operation by the user.

Figure 3A:
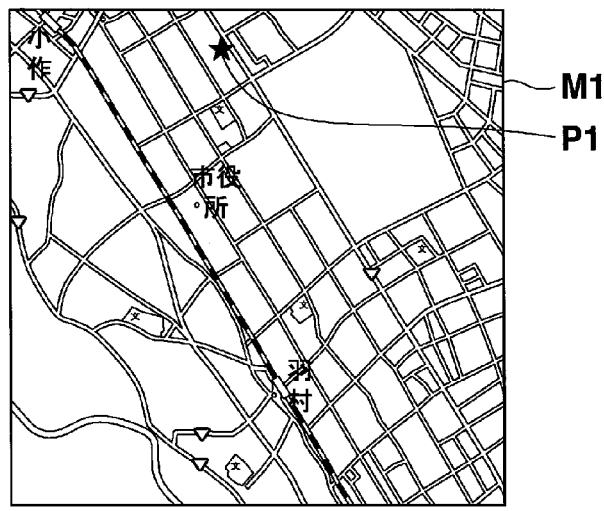
FIGS. 3A, 3B and 3C are views illustrating a function of a destination setting unit of the functional configuration of FIG. 2.
Figure 3B:
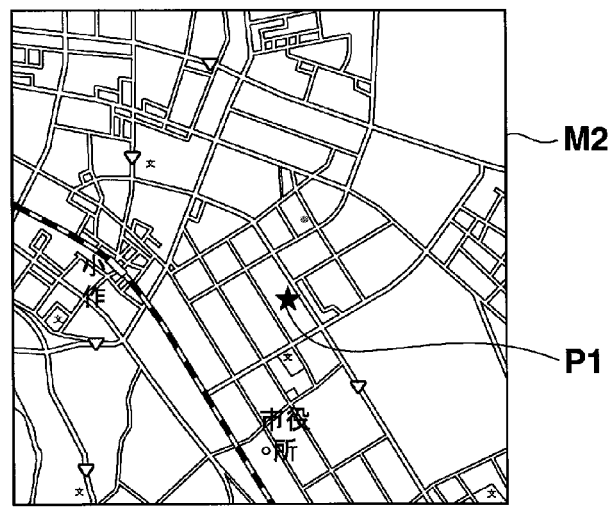
Figure 3C:
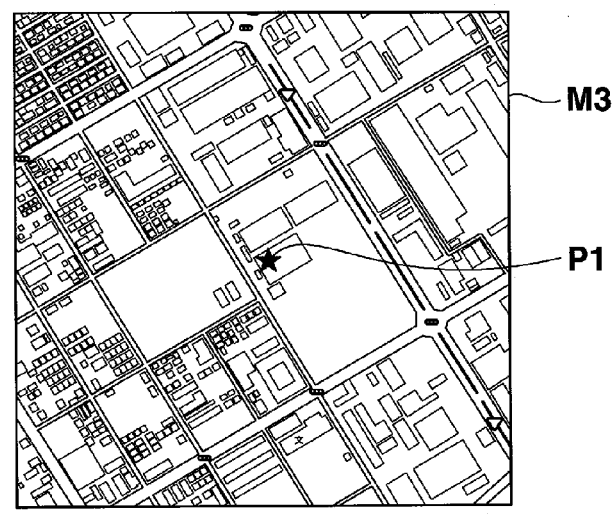

FIGS. 3A, 3B and 3C are views showing a destination setting sequence by the destination setting unit 112 according to a scrolling operation or an enlarging operation by the user.

It should be noted that the star icon in FIGS. 3A, 3B and 3C denotes a destination P1.

Here, a white star icon is shown to facilitate understanding and is not shown on the display unit 16 of an actual information processing device 1.

When the user searches for a destination on a map, the user tends to scroll the map displayed on a display so as to display a map around the destination.

With reference to FIG. 3A, when the user sets a destination P1 as a destination on the map M1 displayed on the display unit 16, the user performs a scrolling operation so that the destination P1 is located at the center of the map.

When scrolling the map on the display unit 16 in response to such a scrolling operation, as shown in FIG. 3B, the map M2 is displayed on the display unit 16 such that the destination P1 is displayed in substantially the center thereof.

Incidentally, when scrolling a map, a user tends to use a small-scale map in order to avoid complicated operations.

However, since it is not possible to display detailed information on the small-scale map, when scrolling the map up to around the destination, then the user tends to enlarge the map around the destination.

As a result, when the user performs an enlarging operation on the map M2 in which the destination P1 is displayed at substantially the center thereof, as shown in FIG. 3C, the map M3 showing around the destination P1 in an enlarged manner is displayed on the display unit 16.

The destination setting unit 112 sets a center portion of the map M3, which has been enlarged after scrolling, as the destination P1.

In this way, by the user simply scrolling and enlarging the map, it becomes possible to set a destination automatically and to enhance its convenience.

It should be noted that, in a case in which the destination setting unit 112 automatically sets a destination, it is preferable to clearly show the destination P1 that is set to be denoted by a black star icon on FIG. 3C on the map M3.

In this way, the user is notified of the destination P1 being set in response to the scrolling operation or the enlarging operation by the user, so that it is possible to avoid incorrect operation.

At this time, if the user performs the scrolling operation to adjust the screen slightly on the map M3 displayed in an enlarged manner, it is preferable to set a center portion on the map after the slight adjustment as the destination P1 again.

Although, at the destination setting unit 112 as described above, the center portion on the map M3 displayed in an enlarged manner is set as the destination P1, the destination P1 is not limited to the center portion of the destination P1 and may be set in accordance with a mode of the user's enlarging operation.

For example, on a display unit 16 of touch-panel type as has come to be known in recent years, information such as a map is enlarged by contacting a touch panel and dragging two touched points on the touch panel in a linear manner (typically, contacting two fingers on the touch panel in a closed state, and then separating the two fingers to an opened state).

Since it is often the case that the two touched portions when enlarging are close to a user's destination, the destination setting unit 112 may set as a destination P1 an intersection of the two lines respectively indicating travel paths of these two touched portions.

More specifically, the destination setting unit 112 receives the travel paths (trajectory) of the touched portions detected by the input unit 18 (touch panel) and sets the destination P1 by specifying the intersection of the travel paths.

In this case as well, it is preferable to show the destination P1 clearly on the map so as to notify the user and also preferable to set the destination P1 again after the fine tuning.

With reference to FIG. 2 again, the movement area setting unit 113 reads positional information of a current location and positional information of a destination from the storage unit 17, and acquires a movement area set based on the positional information.

The movement area acquired by the movement area setting unit 113 is temporarily stored in the storage unit 17, and then supplied to the judgment unit 114.

In the positioning calculation using radio signals such as GPS signals, an error may occur between an actual location and a calculated location.

In this regard, in the present embodiment, even if an error occurs, a movement area is set as a user-acceptable area, and masking is performed on a location calculated beyond the movement area.

In other words, the movement area means a user-acceptable area when an error occurs.

In this way, if the positional information subsequently acquired by the positional information acquiring unit 111 is positional information beyond the movement area acquired based on the positional information of the current location by the movement area setting unit 113, display is not performed based on the positional information beyond the movement area on the display unit 16.

In other words, if the positional information of the current location acquired by the positional information acquiring unit 111 is positional information beyond the movement area acquired by the movement area setting unit 113 based on the positional information prior to acquiring the positional information of the current location, display is not performed based on the positional information beyond the movement area on the display unit 16.

Here, a user-acceptable error range in the navigation service that guides a user from a current location to a destination differs depending on the distance between the current location and the destination.

As an example, in a case in which the distance between the current location and the destination is far, it is sufficient so long as the direction to the destination is roughly known. On the other hand, in a case in which the distance between the current location and the destination is short, information of a detailed positional relationship between the current location and the destination is required.

Therefore, it is preferable to set a movement area based on the distance between positional information of the current location and positional information of the destination.

Figure 4A:
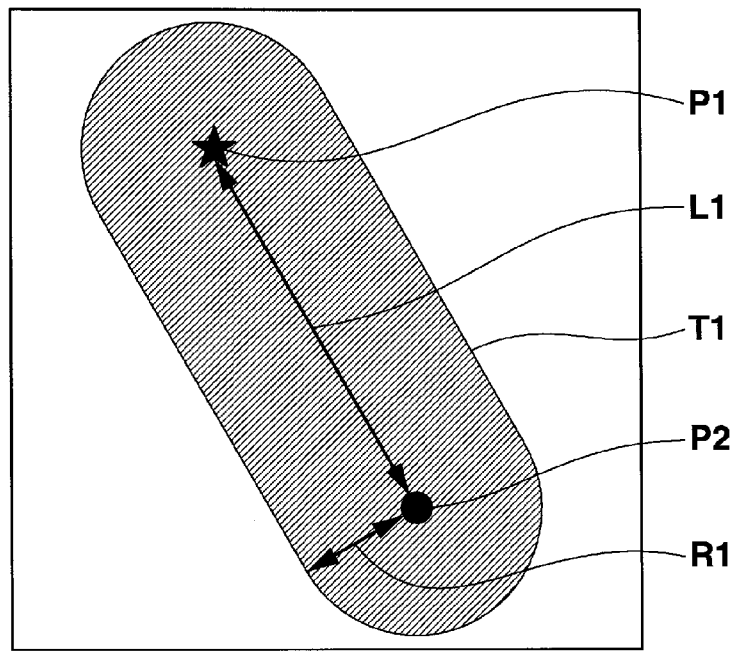
FIGS. 4A and 4B are views illustrating a function of a movement area setting unit of the functional configuration of FIG. 2.
Figure 4B:
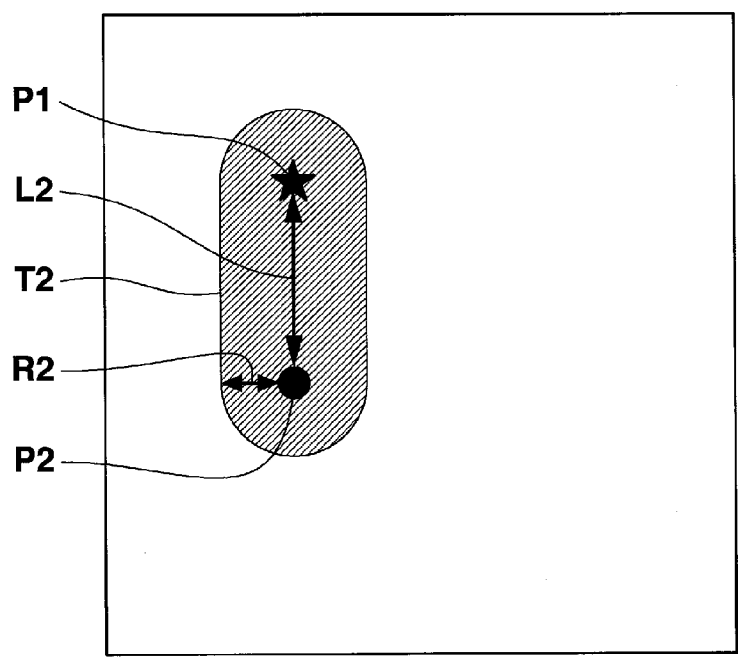

FIGS. 4A and 4B are views showing an example of a movement area acquired by the movement area setting unit 113 based on the distance between positional information of a current location and positional information of a destination.

FIG. 4A shows a movement area T1 acquired in a case in which a distance L1 between a current location P2 and a destination P1 is far.

The movement area T1 is an oval-shaped area (a rectangle with rounded corners) from which any of the destination P1, the current location P2, and the line segment connecting the destination P1 with the current location P2 has a distance of the radius R1.

Furthermore, FIG. 4B shows a movement area T2 that is acquired in a case in which the distance L2 between the current location P2 and the destination P1 is short.

Similarly to the movement area T1, the movement area T2 is an oval-shaped area (a rectangle with rounded corners) from which any of the destination P1, the current location P2, and the line segment connecting the destination P1 with the current location P2 has a distance of the radius R2.

Here, the radius R1 in FIG. 4A and the radius R2 in FIG. 4B have a relationship of radius R1>radius R2.

In other words, the movement area T1 with the distance L1 being far and the movement area T2 with the distance L2 being short have a relationship of movement area T1>movement area T2.

In this way, since the size of a movement area can be set to match the user's need, it is possible to mitigate the user's stress.

For example, settings can be made in which an error up to 500 meters is allowed in a case of 10 kilometers to a destination while an error up to 10 meters is allowed in a case of 100 meters up to a destination.

It should be noted that FIGS. 4A and 4B are explained with the examples of the movement areas T1 and T2 within which the current location P2 and the destination P1 exist.

In this regard, since the user who sets the destination P1 travels in a direction from the current location P2 to the destination P1 and it is not likely that the user would travel in an direction opposite to the direction from the current location P2 to the destination P1, a movement area may not be set for the other side of the current location P2.

Furthermore, although FIGS. 4A and 4B are explained with the examples of the movement areas T1 and T2 of oval-shape (a rectangle with rounded corners), the shape of the movement areas acquired by the movement area setting unit 113 is not limited thereto, and may be in any shape.

FIGS. 5A, 5B, 5C, 5D and 5E are views showing other examples of movement areas acquired by the movement area setting unit 113.

Figure 5A:
FIGS. 5A, 5B, 5C, 5D, and 5E are views showing an example of a form of a movement area acquired by the movement area setting unit of the functional configuration of FIG. 2.

As shown in FIG. 5A, a travel direction of a user is in the direction from the current location P2 to the destination P1.

Figure 5B:
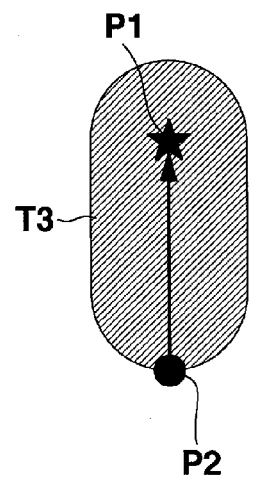

Therefore, as shown in FIG. 5B, a movement area T3 may not be set for the side opposite to the travel direction of the current location P2.

Figure 5C:
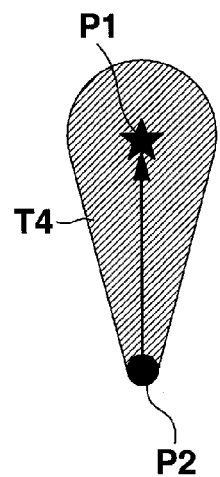

Furthermore, as shown in FIG. 5C, a movement area T4 of fan-shape extending in the direction from the current location P2 to the destination P1, not oval-shape (a rectangle with rounded corners), may be set.

In this way, the movement area can indicate not only the meaning of a user-acceptable area even when an error occurs, but also the meaning of an estimated area in which a user should travel in view of the positional relationship between a current location and a destination.

Figure 5D:
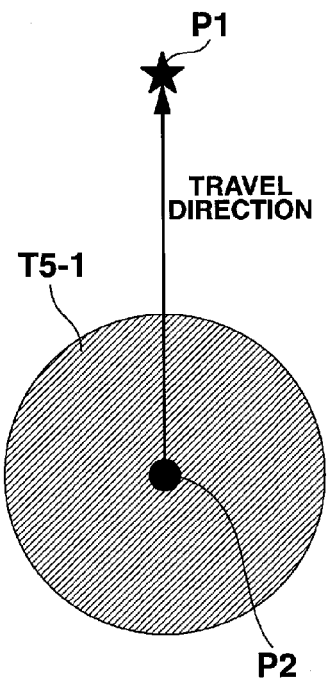

Furthermore, in FIGS. 4A, 4B, 5B and 5C, although the movement areas T1, T2, T3, and T4 are set around the current location P2 and the destination P1, the present invention is not limited thereto, and the movement area T5-1 may be set around the current location P2 as shown in FIG. 5D.

Figure 5E:
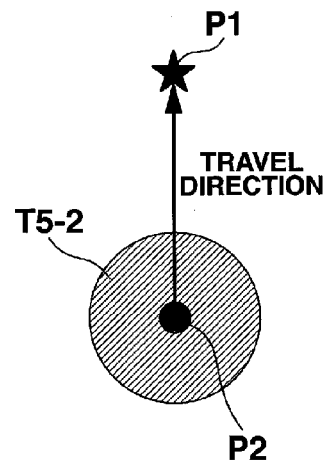

In this case, the movement area set around the current location P2 is set based on the current location P2 and the destination P1. Therefore, as shown by FIGS. 5D-5E, as the distance between the current location P2 and the destination P1 is farther, the wider movement area T5-1 is set, and as the distance between the current location P2 and the destination P1 is shorter, the narrower movement area T5-2 is set.

In this way, it is possible to set the size of the movement area along with a user's need.

It should be noted that the shape of the movement area set around the current location P2 such as the movement areas T5-1 and T5-2 is not limited to a circular shape and may be formed in any shape (for example, a fan-like shape) taking account of a user's travel direction.

Furthermore, a movement area may be set based not only on a distance between positional information of a current position and positional information of a destination, but also other information.

An example of a setting condition for setting a movement area is shown in Table 1.

TABLE 1

| | Setting condition | Content |
| --- | --- | --- |
| Setting condition1 | distance | Long: wide Short: narrow |
| Setting condition2 | Positioning accuracy | Low accuracy: wide High accuracy: narrow |
| Setting condition3 | Travelling speed | Fast: wide Slow: narrow |
| Setting condition4 | Scale size of displayed map | Small: wide Large: narrow |

For example, for the setting condition 2, when a positioning accuracy of positional information showing a current location is low, there is a possibility that an error is occurring regarding the current location.

Therefore, in a case of setting a movement area based on positional information of the current location and positional information of a destination, it is preferable to set the movement area wider so as to set an allowable area of positional information subsequently acquired wider.

In addition, for the setting condition 3, for example, in a case in which a travelling speed of a user is fast such as travelling by car, since the user does not necessarily follow a linear route connecting a current location with a destination, an estimated area in which the user should travel becomes wider.

Therefore, in a case of the travelling speed of a user being fast, it is preferable to set a movement area wider.

It should be noted that the travelling speed of a user can be acquired, for example, based on a change in positional information acquired by the positional information acquiring unit 111 at predetermined time intervals.

Furthermore, for the setting condition 4, in a case in which a scale size of a map displayed on the display unit 16 is small (a small-scale map), it is sufficient so long as the user can specify a positional relationship between a current location and a destination roughly; whereas, in a case in which the scale size of the map is large (an enlarged map), the user requests information of a detailed positional relationship between the current location and the destination.

Therefore, a movement area may be set wider in a case of a small-scale map, while the movement area may be set narrower in a case of a large-scale map.

It should be noted that only one setting condition among the setting conditions from 1 to 4 may be applied or a combination of a plurality of the setting conditions may be applied.

Furthermore, the movement area may be set each time the positional information acquiring unit 111 acquires positional information of a current location or may be set at other timing.

An example of a setting timing of a movement area is shown in Table 2.

TABLE 2

| | Setting timing | Content |
| --- | --- | --- |
| Timing1 | acquiring positional information | predetermined interval |
| Timing2 | travelling speed | fast: short interval slow: long interval |
| Timing3 | distance | short: short interval long: long interval |
| Timing4 | travelling speed with respect to distance | short/fast: short interval shot/slow: short interval long/fast: intermediate interval long/slow: long interval |
| Timing5 | positioning accuracy | timing with a certain level of positioning accuracy ensured |

For the timing 1, a movement area may be set at predetermined intervals when the positional information acquiring unit 111 acquires positional information of a current location.

At this time, the predetermined intervals may be whenever the positional information acquiring unit 111 acquires positional information of a current location or may be whenever the positional information acquiring unit 111 acquires positional information of a current location a predetermined number of times.

On the other hand, as shown at the timings 2 to 5, it may be configured so as to differentiate the interval of setting a movement area.

For the timing 2, in a case of the travelling speed being fast, a change in positional information acquired in a predetermined period of time becomes greater.

Therefore, in a case of the travelling speed being fast, it is preferable to set a movement area frequently.

Therefore, as the timing 2, it may be configured so as to differentiate the interval of setting a movement area depending on travelling speed.

Furthermore, for the timing 3, in a case of the distance to a destination being far, it is sufficient so long as a direction to the destination is roughly known, and since its movement area is set widely, it is not necessary to set the movement area frequently.

On the other hand, in a case of the distance to a destination being short, it is necessary to know a detailed positional relationship between a current location and a destination, and since its movement area is narrow, it is preferable to set a movement area frequently.

Therefore, as at the timing 3, it may be configured so as to differentiate the interval of setting a movement area depending on a distance between a current location and a destination.

Furthermore, as shown at the timing 4, it may be configured so as to differentiate the interval of setting a movement area by combining these timings 2 and 3.

Furthermore, as shown in the timing 5, it may be configured so as to set a movement area in a case in which positioning accuracy of positional information of a current location satisfies a predetermined level of positioning accuracy.

It should be noted that only one setting condition among the timings 1 to 5 may be applied or a combination of a plurality of the setting conditions may be applied.

With reference to FIG. 2 again, the judgment unit 114 compares a movement area acquired by the movement area setting unit 113 with positional information of a current location acquired by the positional information acquiring unit 111, and judges whether the positional information of the current location acquired after the movement area is set exists within the movement area.

When the judgment unit 114 judges whether or not existing within the movement area, the judgment result is supplied to the display control unit 115.

The display control unit 115 executes display control of the display unit 16 in response to the judgment result supplied from the judgment unit 114.

In other words, when it is judged by the judgment unit 114 that the positional information of the current location exists within the movement area, the display control unit 115 displays on the display unit 16 a map showing the current location.

On the other hand, when it is judged by the judgment unit 114 that the positional information of the current location is outside the movement area, the display control unit 115 displays on the display unit 16 a map without showing the current location.

In such a case of not displaying the current location, it is preferable for the display control unit 115 to display predetermined information in place of the current location on the map.

As an example, a location displayed immediately before the current location (hereinafter, referred to as "last current location") may be displayed on the map.

In addition, an arbitrary position on a line segment connecting positional information of the current location with positional information of the last current location may be displayed on the map.

Furthermore, automatic navigation information indicating a travelling direction of a user and a distance that the user travels may be acquired based on a sensor value detected by the sensor unit 20 so as to display on a map a position acquired from the automatic navigation information and positional information of the last current location.

The functional configuration of the information processing device 1 (CPU 11) has been explained above.

Then, navigation processing executed by the information processing device 1 having such a functional configuration is explained.

Figure 7:
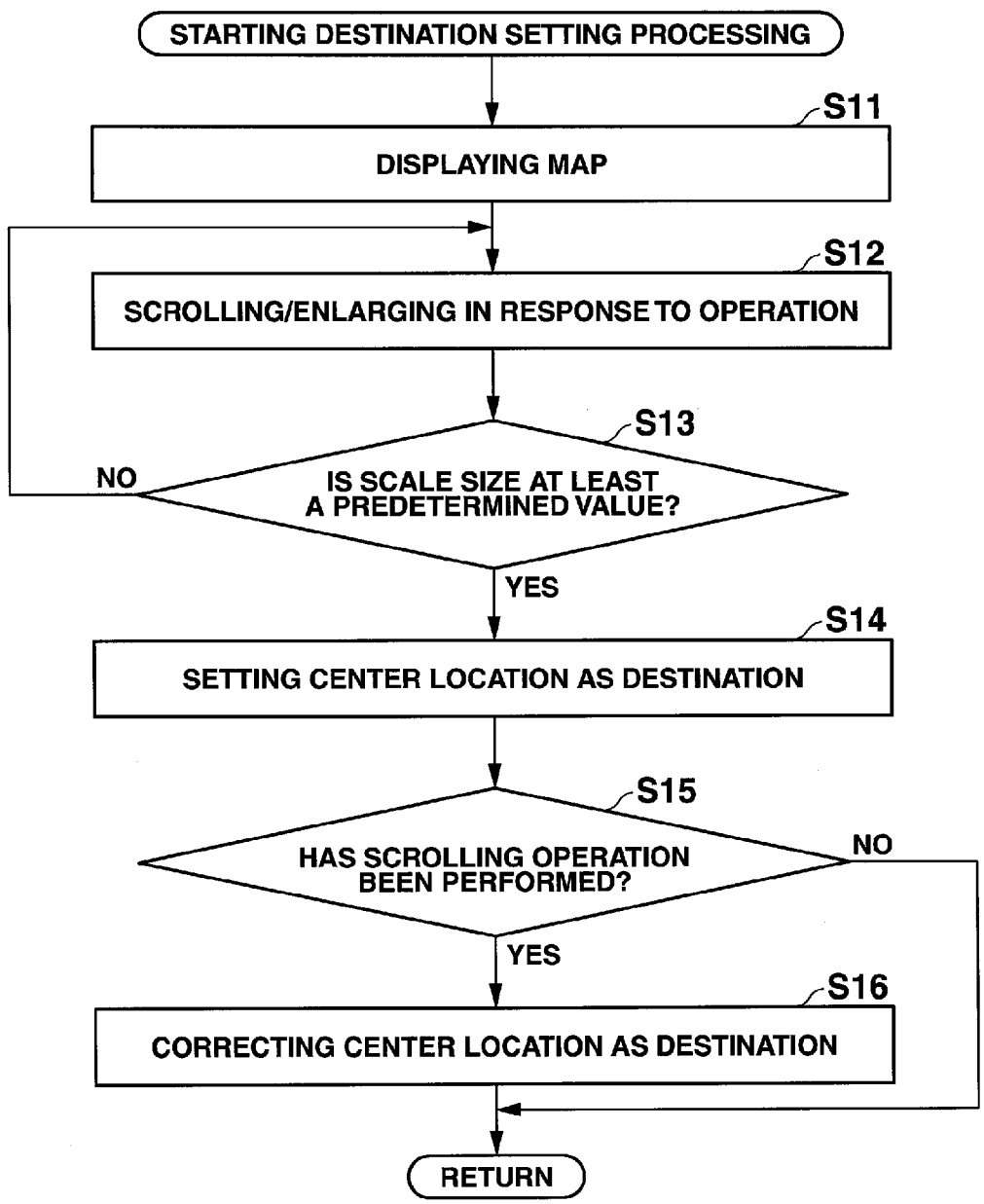
FIG. 7 is a flowchart illustrating a flow of destination setting processing of the information processing device of FIG. 1 having the functional configuration of FIG. 2.

FIG. 6 is a flowchart showing a flow of navigation processing and FIG. 7 is a flowchart showing a flow of destination setting processing of the navigation processing.

With reference to FIG. 6, in Step S1, the CPU 11 starts GPS positioning.

In other words, the CPU 11 starts receiving GPS signals through the GPS antenna 191.

Then, in Step S2, the destination setting unit 112 executes destination setting processing for setting a user's destination.

It should be noted that the details of the destination setting processing are described later in FIG. 7.

Then, in Step S3, the movement area setting unit 113 acquires a movement area based on a location and a destination displayed on a map.

Then, in Step S4, the positional information acquiring unit 111 acquires positional information indicating a current location of the information processing device 1 based on the GPS signals.

Then, in Step S5, the judgment unit 114 judges whether the positional information acquired in Step S4 exists within the movement area acquired in Step S3.

If existing within the movement area, the display control unit 115 displays a current location corresponding to the positional information acquired in Step S4 on a map on the display unit 16 (Step S6), and the processing advances to Step S7.

On the other hand, if outside the movement area, the display control unit 115 does not display the current location on the map on the display unit 16, and the processing advances to Step S7.

Then, in Step S7, the CPU 11 judges whether there is a change in the destination.

In this processing, the CPU 11 judges whether there is a change in the destination by way of receiving a user's operation through the input unit 18, for example.

If there is a change in the destination, the CPU 11 advances the processing to Step S2.

If there is no change in the destination, the CPU 11 advances the processing to Step S8.

In Step S8, the CPU 11 judges whether the user has reached the destination.

In this processing, the CPU 11 judges whether the user has reached the destination by way of judging, for example, whether the positional information of the destination set in Step S2 corresponds to the positional information of the current location acquired in Step S4 (or the positional information of the current location displayed in Step S6).

If the CPU 11 judges that the user has reached the destination (in a case of the positional information of the destination set in Step S2 corresponding to the positional information of the current location acquired in Step S4), the CPU 11 ends the navigation processing.

On the other hand, if the CPU 11 judges that the user has not reached the destination (in a case of the positional information of the destination set in Step S2 not corresponding to the positional information of the current location acquired in Step S4), the CPU 11 repeats the processing from Step S3 to Step S8.

Then, with reference to FIG. 7, in the destination setting processing, the display control unit 115 displays a map on the display unit 16 in Step S11.

Then, in Step S12, the display control unit 115 scrolls a map or displays an enlarged map displayed on the display unit 16 in response to a scrolling operation or an enlarging operation received through the input unit 18.

Then, in Step S13, the destination setting unit 112 judges whether a scale size of a map displayed by the enlarging operation in Step S12 is at least a predetermined value.

If the scale size of the map is at least a predetermined value, in Step S14, the destination setting unit 112 sets a center location on the enlarged map as a destination.

On the other hand, if the scale size of the map is not at lease a predetermined value, the CPU 11 advances the processing to Step S12.

Then, in Step S15, the destination setting unit 112 judges whether a scroll operation has been performed on the enlarged map.

Since the scrolling operation on the enlarged map in this context is assumed as adjusting the destination slightly, the destination setting unit 112 corrects the destination to locate the center location on the map after the fine tuning and ends the destination setting processing.

On the other hand, in a case of not having received a scroll operation on the enlarged map, the CPU 11 ends the destination setting processing.

In the information processing device 1 configured as described above, in a case in which positional information of a current location exists outside a movement area, a user's positional information corresponding to the positional information is not displayed on the map on the display unit 16.

This can avoid providing the user with an erroneous positioning result, a result of which it is possible to mitigate the user's stress.

At this time, since the movement area setting unit 113 acquires the size of the movement area in response to the distance between the positional information of the current location and the positional information of the destination, it is possible to perform appropriate guidance in accordance with the user's need.

In other words, in a case of a distance from a current location to a destination being far, a rough direction to the destination is provided, and in a case of a distance from a current location to a destination being short, it is possible to provide a detailed positional relationship between the current location and the destination.

Furthermore, since a size of the movement area can be set based on a variety of conditions other than the distance between the positional information of the current location and the positional information of the destination and it is also possible to set the movement area with a variety of timings, it is possible to perform appropriate guidance in accordance with the user's need.

It should be noted that the present invention is not to be limited to the aforementioned embodiment, and that modifications, improvements, etc. within a scope that can achieve the object of the present invention are also included in the present invention.

The processing sequence described above can be executed by hardware, and can also be executed by software.

In other words, the hardware configuration shown in FIG. 2 is merely an illustrative example, and the present invention is not particularly limited thereto.

More specifically, the types of functional blocks employed to realize the above-described functions are not particularly limited to the example shown in FIG. 2, so long as the information processing device 1 can be provided with the functions enabling the aforementioned processing sequence to be executed in its entirety.

A single functional block may be configured by a single piece of hardware, a single installation of software, or any combination thereof.

In a case in which the processing sequence is executed by software, a program configuring the software is installed from a network or a storage medium into a computer or the like.

The computer may be a computer embedded in dedicated hardware.

Alternatively, the computer may be a computer capable of executing various functions by installing various programs, e.g., a general-purpose personal computer.

The storage medium containing such a program can not only be constituted by the removable medium 31 shown in FIG. 1 distributed separately from the device main body for supplying the program to a user, but also can be constituted by a storage medium or the like supplied to the user in a state incorporated in the device main body in advance.

The removable medium is composed of, for example, a magnetic disk (including a floppy disk), an optical disk, a magnetic optical disk, or the like.

The optical disk is composed of, for example, a CD-ROM (Compact Disk-Read Only Memory), a DVD (Digital Versatile Disk), or the like.

The magnetic optical disk is composed of an MD (Mini-Disk) or the like.

The storage medium supplied to the user in a state incorporated in the device main body in advance may include, for example, the ROM 12 shown in FIG. 1, a hard disk included in the storage unit 17 shown in FIG. 1 or the like, in which the program is recorded.

It should be noted that, in the present specification, the steps describing the program recorded in the storage medium include not only the processing executed in a time series following this order, but also processing executed in parallel or individually, which is not necessarily executed in a time series.

In addition, in the present specification, a term system shall mean a general device configured from a plurality of devices, a plurality of means, and the like.

Although some embodiments of the present invention have been described above, the embodiments are merely exemplification, and do not limit the technical scope of the present invention.

Other various embodiments can be employed for the present invention, and various modifications such as omission and replacement are possible without departing from the spirits of the present invention.

Such embodiments and modifications are included in the scope of the invention and the summary described in the present specification, and are included in the invention recited in the claims as well as the equivalent scope thereof.

What is claimed is:

1. An information processing device, comprising:
a moving operation unit that moves a map displayed on a display unit;
a display scale size operation unit that enlarges/reduces a size of the map displayed on the display unit;
a destination setting unit that, when the size of the map displayed on the display unit is enlarged in accordance with an enlarging operation after a moving operation through the moving operation unit, and when a scale size of map information displayed on the display unit after the enlarging operation is at least a predetermined size relative to a scale size of the map information displayed before the enlarging operation, sets a center location of the map information displayed on the display unit after the enlarging operation as a destination;
a destination correction unit which, when there is another moving operation through the moving operation unit after the destination is set by the destination setting unit, corrects the destination set by the destination setting unit so as to correspond to a center location of the map information displayed after said another moving operation;
a positional information acquiring unit that acquires positional information indicating a current location of the information processing device measured based on a plurality of signals received at a predetermined time interval;
a movement area setting unit that acquires a movement area that is set based on the positional information acquired by the positional information acquiring unit and positional information of the destination;
a judgment unit that judges whether or not positional information of a current location acquired by the positional information acquiring unit after the movement area is acquired by the movement area setting unit is within the acquired movement area; and
a display control unit that displays the current location on the display unit when the judgment unit judges that the positional information of the current location is within the movement area, and does not display the current location on the display unit when the judgment unit judges that the positional information of the current location is outside the movement area.

2. The information processing device according to claim 1, wherein the movement area setting unit sets a size of the movement area based on a distance between the positional information acquired by the positional information acquiring unit and the positional information of the destination.

3. The information processing device according to claim 1, wherein the movement area setting unit sets a size of the movement area based on positioning accuracy of the positional information acquired by the positional information acquiring unit.

4. The information processing device according to claim 1, wherein the movement area setting unit sets a size of the movement area based on a travelling speed indicated by a change in the positional information acquired at the predetermined time interval.

5. The information processing device according to claim 1, wherein the movement area setting unit sets the movement area at a specific time interval.

6. The information processing device according to claim 1, wherein the movement area setting unit sets the movement area at a time interval corresponding to a travelling speed indicated by a change in the positional information acquired at the predetermined time interval.

7. The information processing device according to claim 1, wherein the movement area setting unit sets the movement area at a time interval according to a distance between positional information of a current location and the positional information of the destination.

8. The information processing device according to claim 1, wherein the movement area setting unit sets the movement area at a time interval corresponding to a relationship between a distance between positional information of a current location and the positional information of the destination and a travelling speed indicated by a change in the positional information acquired at the predetermined time interval.

9. The information processing device according to claim 1, wherein the movement area setting unit sets a size of the movement area when the positional information acquiring unit acquires the positional information with at least a predetermined level of accuracy.

10. A non-transitory computer-readable storage medium having a program stored thereon that enables a computer to function as:

a moving operation unit that moves a map displayed on a display unit;

a display scale size operation unit that enlarges/reduces a size of the map displayed on the display unit;

a destination setting unit that, when the size of the map displayed on the display unit is enlarged in accordance with an enlarging operation after a moving operation through the moving operation unit, and when a scale size of map information displayed on the display unit after the enlarging operation is at least a predetermined size relative to a scale size of the map information displayed before the enlarging operation, sets a center location of the map information displayed on the display unit after the enlarging operation as a destination;

a destination correction unit that, when there is another moving operation through the moving operation unit after the destination is set by the destination setting unit, corrects the destination set by the destination setting unit so as to correspond to a center location of the map information displayed after said another moving operation;

a positional information acquiring unit that acquires positional information indicating a current location of the computer measured based on a plurality of signals received at a predetermined time interval;

a movement area setting unit that acquires a movement area that is set based on the positional information acquired by the positional information acquiring unit and positional information of the destination;

a judgment unit that judges whether or not positional information of a current location acquired by the positional information acquiring unit after the movement area is acquired by the movement area setting unit is within the acquired movement area; and a display control unit that displays the current location on the display unit when the judgment unit judges that the positional information of the current location is within the movement area, and does not display the current location on the display unit when the judgment unit judges that the positional information of the current location is outside the movement area.

* * * * *

UNITED STATES PATENT AND TRADEMARK OFFICE
CERTIFICATE OF CORRECTION

| | | |
|---|---|---|
| PATENT NO. | : 8,725,414 B2 | Page 1 of 1 |
| APPLICATION NO. | : 13/845046 | |
| DATED | : May 13, 2014 | |
| INVENTOR(S) | : Takeshi Matsue et al. | |

It is certified that error appears in the above-identified patent and that said Letters Patent is hereby corrected as shown below:

On the Title page, Item (72) Inventors, delete "Takeahi Matsue" and insert --Takeshi Matsue--.

Signed and Sealed this
Fourth Day of November, 2014

Michelle K. Lee
*Deputy Director of the United States Patent and Trademark Office*